US 10,455,487 B2

United States Patent
Wong et al.

(10) Patent No.: US 10,455,487 B2
(45) Date of Patent: Oct. 22, 2019

(54) REPETITIVE TRANSMISSION FOR NB-IOT

(71) Applicant: Sony Corporation, Tokyo (JP)

(72) Inventors: Shin Horng Wong, Basingstoke (GB);
Martin Warwick Beale, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/078,645

(22) PCT Filed: Feb. 9, 2017

(86) PCT No.: PCT/EP2017/052874
§ 371 (c)(1),
(2) Date: Aug. 22, 2018

(87) PCT Pub. No.: WO2017/153118
PCT Pub. Date: Sep. 14, 2017

(65) Prior Publication Data
US 2019/0053140 A1 Feb. 14, 2019

(30) Foreign Application Priority Data

Mar. 11, 2016 (EP) .................................... 16160026

(51) Int. Cl.
*H04L 1/08* (2006.01)
*H04W 48/16* (2009.01)
(Continued)

(52) U.S. Cl.
CPC ............... *H04W 48/16* (2013.01); *H04L 1/08* (2013.01); *H04L 5/0053* (2013.01);
(Continued)

(58) Field of Classification Search
CPC ....... H04L 1/08; H04L 5/0053; H04L 5/0094; H04L 67/12; H04L 1/0072; H04L 1/1812;
(Continued)

(56) References Cited

U.S. PATENT DOCUMENTS

2015/0131579 A1* 5/2015 Li .............................. H04L 1/08
370/329
2016/0353420 A1* 12/2016 You ....................... H04L 5/0053
(Continued)

FOREIGN PATENT DOCUMENTS

EP 2 919 402 A1 9/2015

OTHER PUBLICATIONS

"Way Forward on NB-IoT," CMCC, Vodafone, Ericsson, Huawei, HiSilicon, Deutsche Telekom, Mediatek, Qualcomm, Nokia Networks, Samsung, Intel, Neul, CATR, AT&T, NTT DOCOMO, ZTE, Telecom Italia, IITH, CEWiT, Reliance-Ho, CATT, u-blox, China Unicorn, LG Electronics, Panasonic, Alcatel-Lucent, Alcatel-Lucent Shanghai Bell, China Telecom, R1-157783, 3GPP TSG RAN WG1 #83, Anaheim, USA, Nov. 15-22, 2015, pp. 1-3.
(Continued)

*Primary Examiner* — Nathan S Taylor
(74) *Attorney, Agent, or Firm* — Xsensus LLP

(57) ABSTRACT

A terminal device for use with a wireless telecommunications network, the terminal device comprising: a receiver; and a controller operable to control the receiver to receive data from the wireless telecommunications network, wherein the data is transmitted using a candidate of a radio search space, the radio search space being defined by a plurality of candidates and each candidate of the radio search space being defined by a set of time and/or frequency radio resources for use in repeatedly transmitting the data a number of times associated with that candidate, and wherein the controller is operable to control the receiver to attempt to receive the data from each candidate of the radio search space; wherein the controller is operable to determine the radio search space on the basis of a predetermined radio search space and one or more multiplier values, wherein the number of times that data is repeatedly transmittable using
(Continued)

each candidate of the radio search space is determined using multiplication of a predetermined number of times that data is repeatedly transmittable using a corresponding candidate of the predetermined radio search space with a respective one of the one or more multiplier values, wherein each of the one or more multiplier values is variable based on a value of each of one or more predetermined parameters.

20 Claims, 6 Drawing Sheets

(51) Int. Cl.
| | | |
|---|---|---|
| *H04L 5/00* | (2006.01) | |
| *H04L 29/08* | (2006.01) | |
| *H04W 8/22* | (2009.01) | |
| *H04W 84/14* | (2009.01) | |

(52) U.S. Cl.
CPC ............ *H04L 5/0094* (2013.01); *H04L 67/12* (2013.01); *H04W 8/22* (2013.01); *H04W 84/14* (2013.01)

(58) Field of Classification Search
CPC ..... H04L 1/1845; H04L 1/1858; H04L 1/189; H04W 84/14; H04W 8/22; H04W 48/16; H04W 4/70; H04W 52/0212; H04W 68/005; H04W 68/025; H04W 72/042; H04W 76/27; H04W 76/28
USPC ......................................................... 370/329
See application file for complete search history.

(56) References Cited

U.S. PATENT DOCUMENTS

| | | | | |
|---|---|---|---|---|
| 2017/0094621 A1* | 3/2017 | Xu | ....................... | H04W 56/001 |
| 2017/0181135 A1* | 6/2017 | Chen | ..................... | H04L 5/0048 |
| 2017/0201932 A1* | 7/2017 | Yeh | ........................ | H04W 48/12 |
| 2017/0201982 A1* | 7/2017 | Rico Alvarino | .... | H04W 72/042 |
| 2017/0318620 A1* | 11/2017 | Tseng | ................ | H04W 72/0413 |
| 2017/0339677 A1* | 11/2017 | Rico Alvarino | ...... | H04L 5/0091 |
| 2017/0367121 A1* | 12/2017 | Wei | .................... | H04W 74/0833 |
| 2018/0077697 A1* | 3/2018 | Shokri Razaghi | ...... | H04L 67/12 |
| 2018/0213468 A1* | 7/2018 | Chatterjee | ............. | H04L 5/0053 |
| 2018/0270756 A1* | 9/2018 | Bhattad | ............ | H04W 52/0225 |
| 2018/0316464 A1* | 11/2018 | Stern-Berkowitz | .......................... H04L 1/0034 | |
| 2018/0317198 A1* | 11/2018 | Lee | ......................... | H04W 4/70 |
| 2019/0029005 A1* | 1/2019 | Bendlin | ............. | H04W 72/042 |

OTHER PUBLICATIONS

3GPP TR 36.888 V2.1.0, 3rd Generation Partnership Project; Technical Specification Group Radio Access Network; Study on provision of low-cost MTC UEs based on LTE; (Release 12), 3GPP Draft; R1-132798_3GPP_TR_36.888, 2013, pp. 1-58.

ASUSTeK, "Consideration on random access for further MTC enhancement," R2-153486, 3GPP TSG-RAN WG2 Meeting #91, Beijing, China, Aug. 24-28, 2015, pp. 1-6.

Holma, H. and Toskala, A., "LTE for UMTS: OFDMA and SC-FDMA Based Radio Access," First published:Mar. 31, 2009, Copyright © 2009 John Wiley & Sons, Ltd,Print ISBN:9780470994016, pp. 1-8.

Qualcomm Incorporated, "New Work Item: NarrowBand IOT NB-IOT," RP-151621, 3GPP TSG RAN Meeting #69, Phoenix, USA, Sep. 14-16, 2015, pp. 1-9.

"RAN WG1: Status Report to TSG 1 plan related evaluation," RP-160183, 3GPP TSG RAN meeting #71, Göteborg, Sweden, Mar. 7-10, 2016, pp. 1-49.

WI Rapporteur (Ericsson), "RAN1 agreements for Rel-13 NB-IoT," R1-161548, 3GPP TSG-RAN WG1 Meeting #84, St. Julian's, Malta, Feb. 15-19, 2016, pp. 1-11.

International Search Report and Written Opinion for International Application No. PCT/EP2017/052874 dated Mar. 23, 2017.

* cited by examiner

REPETITIVE TRANSMISSION FOR NB-IOT

BACKGROUND

Field of Disclosure

The present disclosure relates to a terminal device, infrastructure equipment, methods and integrated circuitry for use with a wireless telecommunications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation wireless communications systems, such as those based on the third generation project partnership (3GPP) defined UMTS and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication devices, devices which require little or no mobility, high resolution video displays and virtual reality headsets. As such, supporting such a wide range of communications devices can represent a technical challenge for a wireless communications network.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network. Furthermore such NB-IoT devices are likely to be deployed indoors and/or in remote locations making radio communications challenging.

SUMMARY OF THE DISCLOSURE

In an embodiment, the present technique provides a terminal device for use with a wireless telecommunications network, the terminal device comprising: a receiver, and a controller operable to control the receiver to receive data from the wireless telecommunications network, wherein the data is transmitted using a candidate of a radio search space, the radio search space being defined by a plurality of candidates and each candidate of the radio search space being defined by a set of time and/or frequency radio resources for use in repeatedly transmitting the data a number of times associated with that candidate, and wherein the controller is operable to control the receiver to attempt to receive the data from each candidate of the radio search space; wherein the controller is operable to determine the radio search space on the basis of a predetermined radio search space and one or more multiplier values, wherein the number of times that data is repeatedly transmittable using each candidate of the radio search space is determined using multiplication of a predetermined number of times that data is repeatedly transmittable using a corresponding candidate of the predetermined radio search space with a respective one of the multiplier values, wherein each of the one or more multiplier values is variable based on a value of each of one or more predetermined parameters.

In another embodiment, the present technique provides infrastructure equipment for use with a wireless telecommunications network, the infrastructure equipment comprising: a transmitter; and a controller operable to control the transmitter to transmit data to a terminal device of the wireless telecommunications network, wherein the data is transmitted using a candidate of a radio search space, the radio search space being defined by a plurality of candidates and each candidate of the radio search space being defined by a set of time and frequency radio resources for use in repeatedly transmitting the data a number of times associated with that candidate wherein the controller is operable to determine the radio search space on the basis of a predetermined radio search space and one or more multiplier values, wherein the number of times that data is repeatedly transmittable using each candidate of the radio search space is determined using multiplication of a predetermined number of times that data is repeatedly transmittable using a corresponding candidate of the predetermined radio search space with a respective one of the multiplier values, wherein each of the one or more multiplier values is variable based on a value of each of one or more predetermined parameters.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Conventional Communications System

Figure 1:
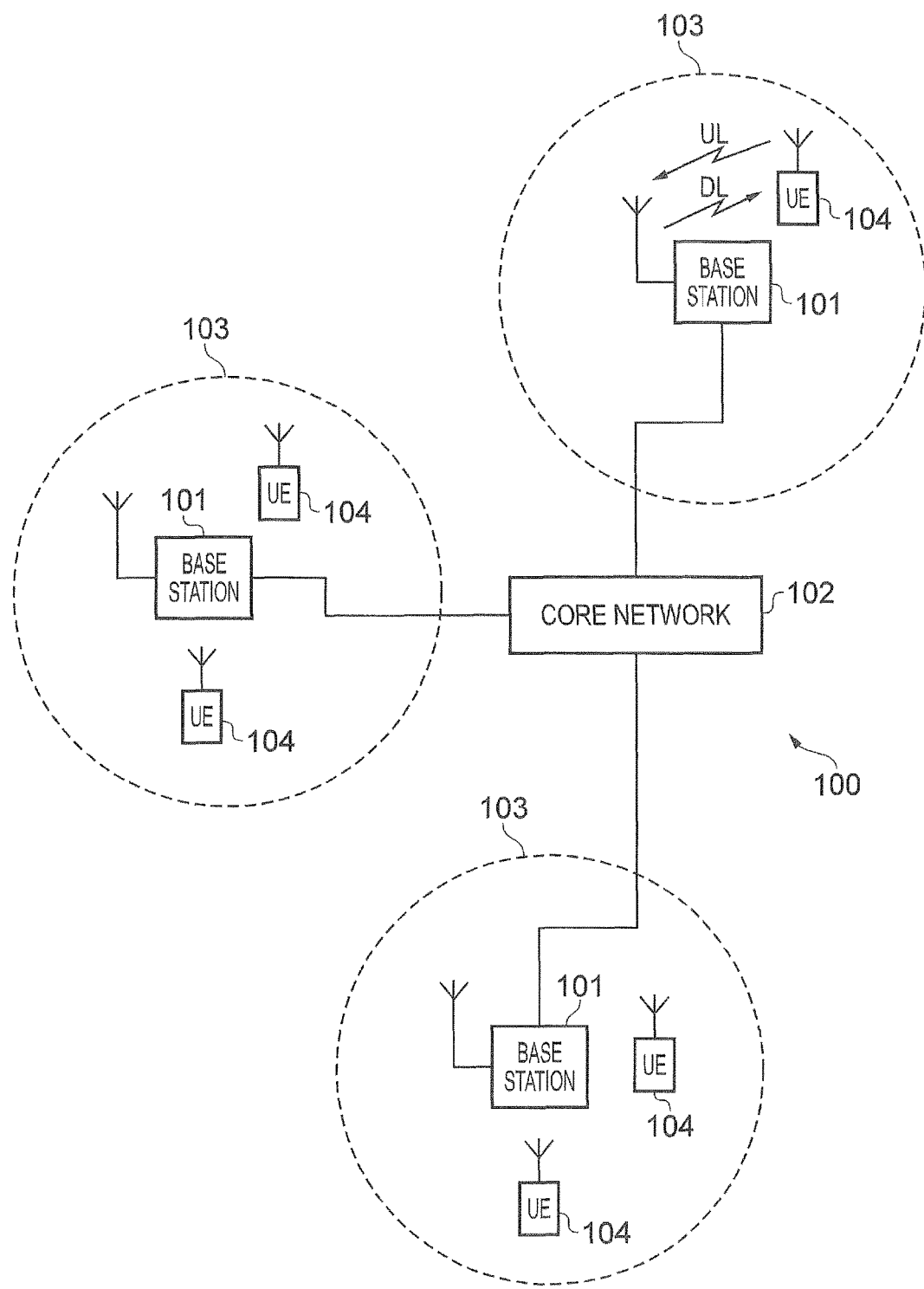
FIG. 1 is a schematic block diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licenced for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, mobile radio, terminal device and so forth. Base stations may also be referred to as transceiver stations/infrastructure equipment/ NodeBs/eNodeBs (eNB for short), and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Figure 2:
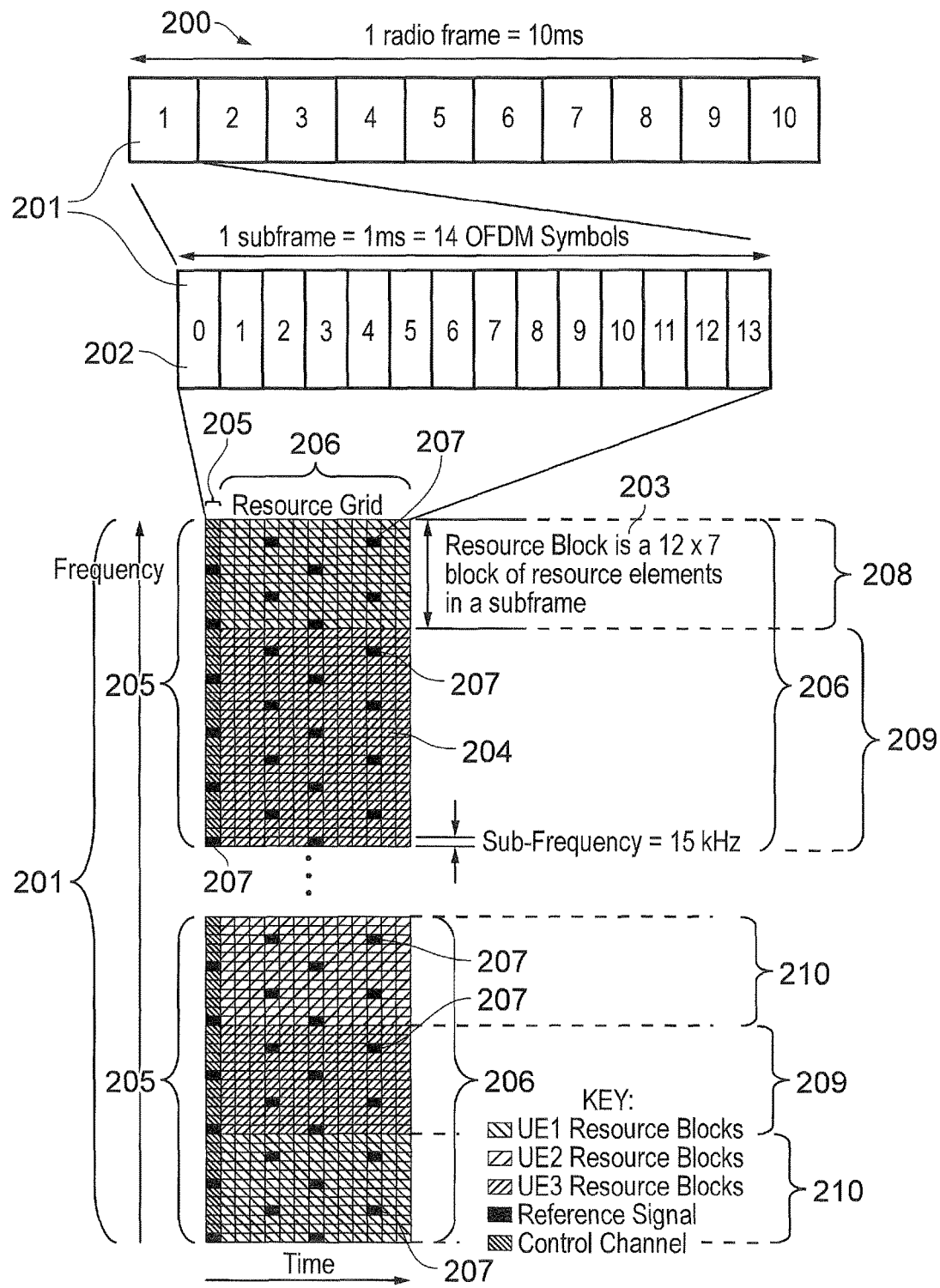
FIG. 2 is a schematic representation illustrating a frame structure of a downlink of a wireless access interface according to an LTE standard.

FIG. 2 provides a simplified schematic diagram of the structure of a downlink of a wireless access interface that may be provided by or in association with the eNB of FIG. 1 when the communications system is operating in accordance with the LTE standard. In LTE systems the wireless access interface of the downlink from an eNB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHz and 20 MHz bandwidth may be divided into 128 to 2048 orthogonal subcarriers for example. Each subcarrier bandwidth may take any value but in LTE it is conventionally fixed at 15 kHz. However it has been proposed in the future [2][3] to provide also a reduced subcarrier spacing of 3.75 kHz for certain parts of the LTE wireless access interface for the uplink. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. More details of the downlink structure of the LTE wireless access interface are provided in Annex 1.

Figure 3:
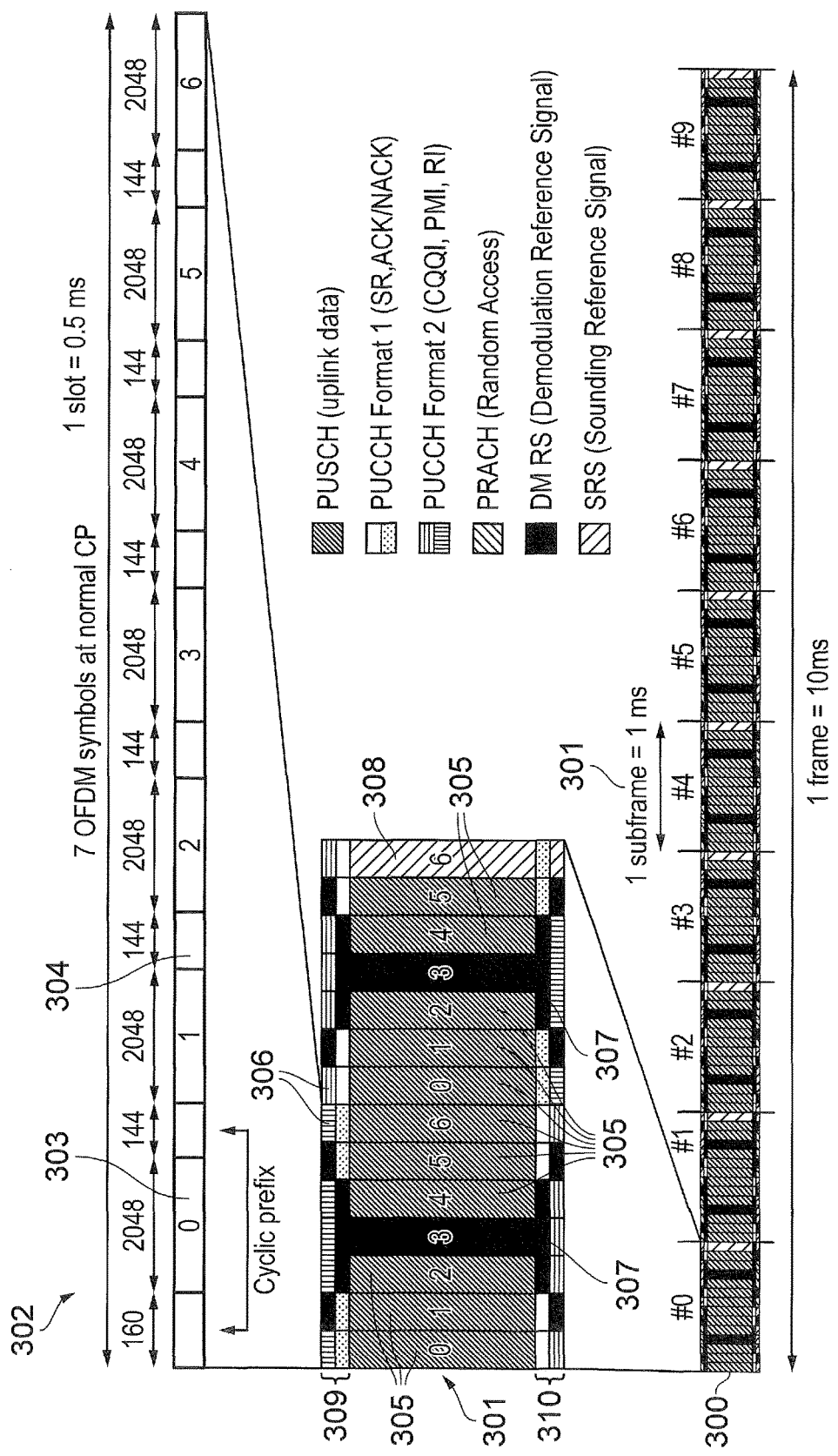
FIG. 3 is a schematic representation illustrating a frame structure of an uplink of wireless access interface according to an LTE standard.

FIG. 3 provides a simplified schematic diagram of the structure of an uplink of an LTE wireless access interface that may be provided by or in association with the eNB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes. More details of the LTE uplink represented in FIG. 3 are provided in Annex 1.

Narrowband Internet of Things

Figure 4:
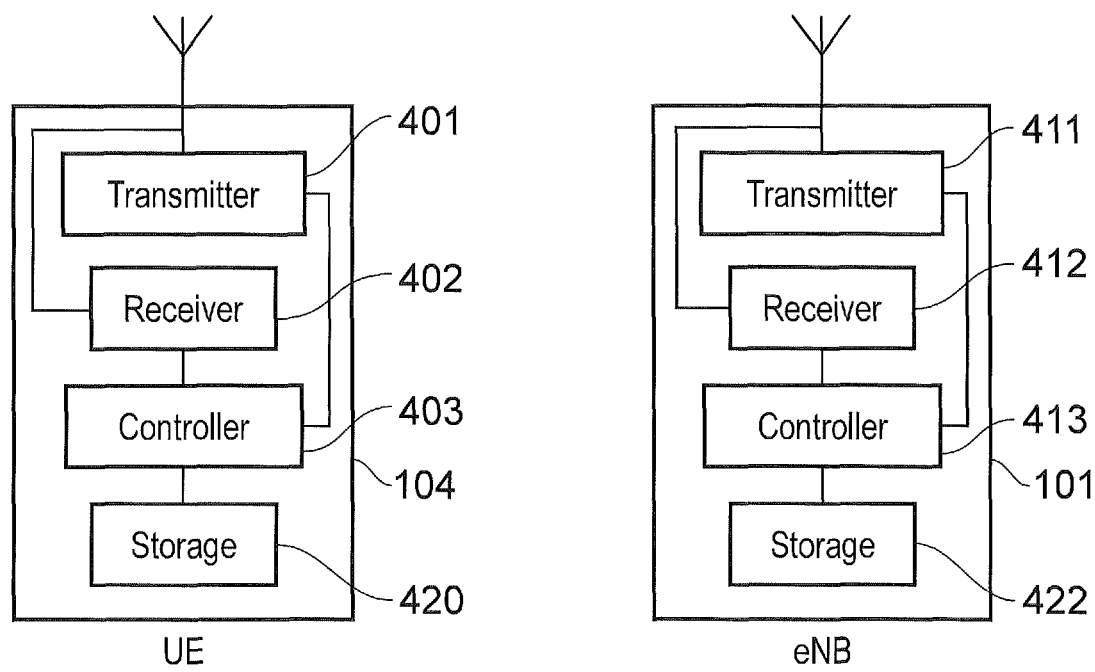
FIG. 4 is a schematic representation of a terminal device and infrastructure equipment.

As explained above, it has been proposed to develop an adaptation of a mobile communications network to accommodate narrow band communications within an existing wireless access interface which has been developed to provide broadband wireless communications. For example, in 3GPP a project relating to improvements to LTE wireless access interfaces to provide for a Narrowband Internet of Things (NB-IoT) was agreed [2]. This project is aimed at improved indoor coverage, support for massive number of low throughput devices, low delay sensitivity, ultra-low device cost, low device power consumption and (optimised) network architecture. An example of such a device is a smart meter. It has been proposed that an NB-IoT communications system supports a bandwidth of only 180 kHz and can have three operational modes:

1. 'Stand-alone operation' utilizing for example the spectrum currently being used by GERAN systems as a replacement of one or more GSM carriers 2. 'Guard band operation' utilizing the unused resource blocks within a LTE carrier's guard-band 3. 'In-band operation' utilizing resource blocks within a normal LTE carrier FIG. 4 provides an example schematic block diagram of a terminal device or UE 104 and an infrastructure equipment or eNB 101 according to embodiments of the present technique. As shown in FIG. 4, the UE 104 includes a transmitter 401 and a receiver 402 (which together form a transceiver) which are controlled by a controller 403. The UE 104 also comprises a storage medium 420 for storing data. Correspondingly, the eNB 101 includes a transmitter 411 and a receiver 412 (which together form a transceiver) which are controlled by a controller 413 (which can also implement a scheduler function). The eNB 101 also comprises a storage medium 422 for storing data. As explained above, the UE 104 transmits and receives signals to and from the eNB 101 via a wireless access interface provided by the eNB as part of the wireless communications network. Each of the UE 104 and eNB 101 are configured to exchange signals with each other using NB-IoT.

One of the objectives of NB-IoT is to provide extended coverage of up to 20 dB. The main mechanism to extend coverage is to perform numerous repetitions of a message to be received at a receiving device, such that the receiver can accumulate the signal energy over the repetitive samples in order for it to have an increased signal-to-noise ratio (SNR), which increases the likelihood of successful decoding of the message at the receiving device. Such a mechanism is known as coverage enhancement (CE).

Coverage enhancement (CE) may have several levels. For example, it may provide one of 5 dB, 15 dB and 20 dB additional coverage enhancement. In NB-IoT, the CE levels may be referred to as the targeted MCL (Max Coupling Loss, the achievable coupling loss (accounting for, for example, path loss, feeder losses and/or antenna gains) between transmitter and receiver) of, for example, 144 dB, 154 dB and 164 dB (so that the higher the targeted MCL, the greater the additional coverage enhancement).

As previously mentioned, repetitions of a signal so that a receiver can accumulate energy of the signal over numerous repetitive samples is the basic method used for coverage enhancement. The number of repetitions required is dependent upon the CE level. Thus, a UE at a lower CE level such as at 144 dB MCL requires less repetition compared to one at a higher CE level such as at 154 dB MCL. The power spectral density, PSD (mW/Hz) of a transmission also affects the number of repetitions required, that is, the larger the PSD, the less the required number of repetitions.

In In-band operation, the power of the eNB is shared between NB-IoT and LTE transmission and hence the available power for NB-IoT is less than that compared to Stand-alone operation where all the eNB power is dedicated to NB-IoT. That is, the PSD of a downlink transmission for NB-IoT in Stand-alone operation is higher than that in In-band operation.

The NB-PDCCH (Narrow Band Physical Downlink Control Channel) is a control channel that is used to schedule downlink resources (downlink grant) and uplink resources (uplink grant) for a NB-PDSCH (Narrow Band Physical Downlink Shared Channel) and a NB-PUSCH (Narrow Band Physical Uplink Shared Channel) that carry data traffic. An NB-PDCCH search space consists of multiple NB-PDCCH candidates wherein each candidate has a specific starting time, set of subcarriers, a defined number of repetitions and an aggregation level (the aggregation level relating to the number of frequency resources occupied by the candidate such that when the candidate occupies a higher number of frequency resources, the aggregation level is higher, and when the candidate occupies a lower number of frequency resources, the aggregation level is lower). Candidates that have a larger number of repetitions and a higher aggregation level are more robust and can reach a UE at poorer coverage compared to candidates that have a smaller number of repetitions and a low aggregation level.

Figure 5:
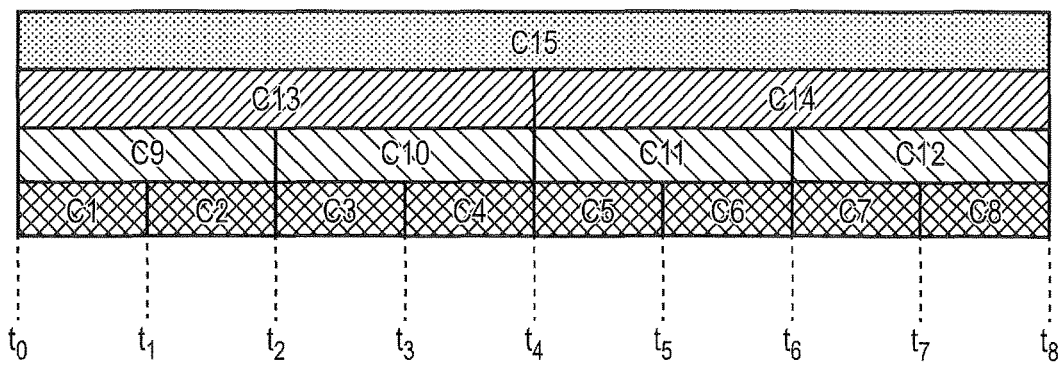
FIG. 5 is a schematic representation of an NB-PDCCH search space.

The eNB uses one of the candidates in the search space to carry the NB-PDCCH. The UE is not aware which candidate is used and so it must blind decode all the candidates in the search space in order to find the candidate used by the eNB for the NB-PDCCH. An example of a typical NB-PDCCH search space is shown in FIG. 5. Here, the search space has 4 repetition levels {R1, R2, R3, R4} where R4=2×R3=4× R2=8×R1. It should be appreciated that an NB-PDCCH search space with other repetition levels is also possible. As an example the eNB can use any of the 15 candidates (labelled as C1 to C15) to carry the NB-PDCCH and the UE has to blind decode for all 15 candidates. The max repetition $R_{MAX}$ (in FIG. 5, $R_{MAX}$=R4) of the search space is assigned to the UE based on the UE's radio condition. Thus, for example, if the UE is in a poorer quality radio coverage location, then the eNB can configure a search space with a larger value of $R_{MAX}$, and if the UE is in a better quality radio coverage location, then the eNB can configure a search space with a smaller value of $R_{MAX}$. Typically, a set of NB-PDCCH search spaces is predefined in which each NB-PDCCH search space of the set consists of a set of candidates and a value of $R_{MAX}$. The UE is then assigned one NB-PDCCH search space in the set of NB-PDCCH search spaces.

In NB-IoT, paging is performed when a UE is in idle mode. More specifically, when in idle mode, the UE monitors an NB-PDCCH CSS (Common Search Space) which, in the case that a paging message is to be transmitted to the UE, contains an NB-PDCCH that schedules that paging message (the paging message being carried by an NB-PDSCH). In some proposed implementations, the eNB is not aware of the UE location when the UE is in idle mode. Thus, the eNB is not aware of the required CE level of a UE in idle mode. Hence, it is difficult for the eNB to determine $R_{MAX}$ for the paging CSS. Furthermore, the paging CSS and its corresponding $R_{MAX}$ needs to be common (that is, cell specific) to all UEs in the cell, since paging is targeted to all UEs in the cell. As a consequence of this, the dynamic range of the number of repetitions in the CSS (that is, difference between the highest repetition $R_{MAX}$ and the lowest repetition $R_{MIN}$) needs to be large enough to cover a large range of CE levels (from the CE level required by a UE close to the eNB to the CE level required by a UE in extreme coverage at the edge of the cell).

A problem with this, however, is that an increase in the dynamic range of the CSS may reduce the granularity of the number of repetitions and that the 4 levels of repetitions (exemplified in FIG. 5, for example) may not be sufficient for the paging CSS. In order to alleviate this problem, it has been suggested that size of the set of paging CSSs (that is, the number of predefined NB-PDCCH search spaces for use as the paging CSS) is increased to a number (for example, 16) sufficient to cater for differences in the target coverage of a cell (it is noted that not all cells would need to target paging to UEs using the maximum 164 dB MCL coverage enhancement and therefore such cells can benefit from using a paging CSS with a smaller value of $R_{MAX}$). However, this still leaves the problem of how to efficiently indicate the different search spaces (each with different values of $R_{MAX}$).

In order to alleviate this problem, in an embodiment of the present technique, a reference set of NB-PDCCH search spaces is defined. Each NB-PBCCH search space in the reference set may be referred to as a Reference Search Space (RSS). The full set of NB-PDCCH search spaces (which may be used, for example, as the paging CSS) may then derived by using one of the RSSs and other known parameters. These known parameters may be indicated by the eNB in the broadcast message such as the MIB (Master Information Block) or SIB (System Information Block), for example (this is explained in more detail later on).

In an embodiment, a particular NB-PBCCH search space is derived using a repetition multiplier Mi which is applied to the repetition Ri in the RSS. In one example, the RSS has candidates with repetition $\{R1, R2, R3, R4\}$ and a set of repetition multipliers $M=\{M_1, M_2, M_3, M_4\}$ is applied to the RSS repetition in order to produce the repetition $\{M_1 \times R1, M_2 \times R2, M_3 \times R3, M_4 \times R4\}$ for the candidates of the particular NB-PBCCH search space which is to be used. The set of multipliers M is dependent upon the known parameters. The set of multipliers (multiplier values) which vary with the known parameters can be specified in the specifications or indicated in the SIBs.

In one embodiment, the said known parameter is the operational mode (which, in the case of NB-IoT, may be in-band, stand-alone or guard band, as previously described). This embodiment recognises that in different respective operational modes, the PSD for NB-IoT is different and hence a different number of repetitions is required for the same CE level. For example, in stand-alone operation mode there is 43 dBm per PRB (physical resource block) whilst in a 10 MHz in-band operation mode the PSD is to 26 dBm per PRB. This means that the stand-alone operation mode requires 50 times less repetition compared to the same CE level in the in-band operation mode. Thus, the RSS can be based on the stand-alone operation, and the repetitions are multiplied by 1 if the stand-alone operation mode is indicated in the MIB (that is, $M=\{1, 1, 1, 1\}$, for example) and 50 if the in-band operation mode is indicated in the MIB (that is, $M=\{50, 50, 50, 50\}$, for example).

In another embodiment, the known parameter is the system bandwidth. The system bandwidth determines the power available for a PRB (that is, the PSD). For example, for an eNB of a given total output power, the PSD is higher in a 5 MHz (25 PRBs) system bandwidth compared to that in a 20 MHz system bandwidth (100 PRBs), since the same power from the eNB is spread across more PRBs in the 20 MHz system bandwidth. For example, if the RSS is based on the PSD of a stand-alone operation, then the repetitions of the search space for a 5 MHz system bandwidth is 25 times that of the RSS (that is, $M=\{25, 25, 25, 25\}$, for example) whilst the repetitions of the search space for a 20 MHz system bandwidth is 100 times that of the RSS (that is, $M=\{100, 100, 100, 100\}$, for example).

In another embodiment, the known parameter is the eNB transmission power. The higher the transmission power, the lower the required number of repetitions (and thus the lower the required multipliers). Conversely, the lower the transmission power, the higher the required number of repetitions (and thus the higher the required multipliers).

It should be appreciated that the NB-PDCCH search space to be used can be derived from the RSS using a combination of different parameters (that is, using a combination of different parameters to determine the set of multipliers). For example, both operational mode and system bandwidth parameters could be used. Furthermore, it will be appreciated that, although the present technique has been described in relation to the paging CSS, the present technique is not so limited. Rather, it can be applied to other search spaces, in particular, other NB-PDCCH search spaces such as USS (User Specific Search Space) and CSS (Common Search Space) for Random Access Response (RAR), Random Access Channel (RACH) Msg3 Retransmission and RACH Msg4.

Figure 6:
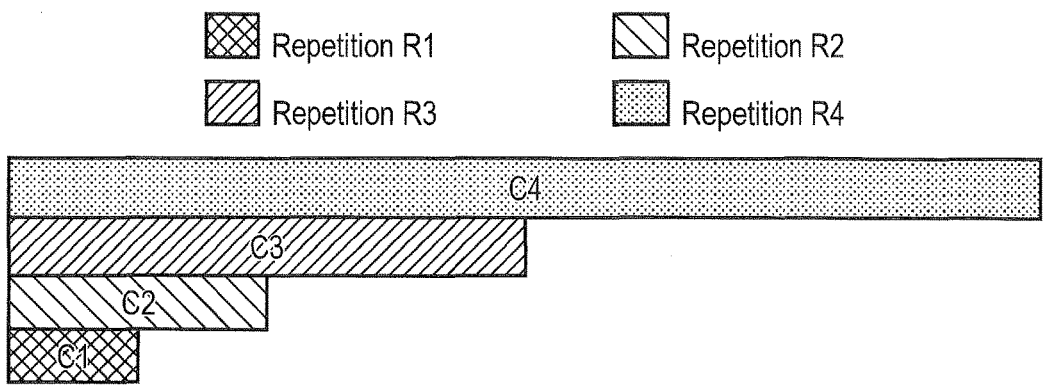
FIG. 6 is a schematic representation of an NB-PDCCH common search space with a reduced number of candidates.

To give a specific example of the present technique, FIG. 6 is an example of an NB-PDCCH Common Search Space (CSS) for scheduling of paging messages to a UE in idle mode. The CSS has 4 repetition levels and 4 candidates $\{C1, C2, C3, C4\}$. This reduced number of candidates (compared to the 15 candidates shown in FIG. 5, for example) is typically used for paging in order to reduce the number of blind decodes required of the UE in idle mode. An example set of RSS and their repetitions are listed in Table 1.

TABLE 1

| RSS | Number of Repetitions | | | |
|-----|----|----|----|----|
|     | R1 | R2 | R3 | R4 |
| 1   | 1  | 4  | 16 | 64 |
| 2   | 2  | 4  | 32 | 128 |
| 3   | 2  | 8  | 64 | 256 |
| 4   | 2  | 8  | 16 | 32 |

Table 2 shows an example of various sets of multipliers to be applied to one of the RSSs in Table 1. In this case, each set of multipliers is associated with a different operation mode (that is, stand-alone, in-band or guard-band).

TABLE 2

| Operational Mode | Multiplier | | | |
|---|---|---|---|---|
|   | $M_1$ | $M_2$ | $M_3$ | $M_4$ |
| Stand-alone | 1 | 1 | 1 | 0.5 |
| In-band     | 1 | 2 | 4 | 4 |
| Guard-band  | 1 | 1 | 2 | 2 |

Thus, consider, for example, a case in which the eNB is operating in in-band operation mode and uses RSS #2 for the paging CSS to cover a certain number of CE levels. The eNB indicates RSS #2 in the SIB. From Table 1 the RSS repetition=$\{2, 4, 32, 128\}$ and from Table 2 the multiplier $M=\{1, 2, 4, 4\}$. The corresponding paging CSS which is actually used would therefore have repetition $\{1 \times 2, 2 \times 4, 4 \times 32, 4 \times 128\}=\{2, 8, 128, 512\}$.

It is noted that the multiplier M typically corresponds to the difference between the PSD of the RSS and the PSD used for transmission. For example, if the PSD of the RSS is that associated with a 5 MHz system bandwidth but the transmission uses a 20 MHz system bandwidth (the PSD of the 5 MHz system bandwidth being four times that of a 20 MHz system bandwidth), then the multiplier M would typically has a factor of 4. Some of the multiplier values would be maintained to give the dynamic range. An example is $M=\{1, 1, 4, 4\}$, where the first two multipliers are used to ensure the dynamic range is available to cover UE close to the infrastructure equipment of the cell. However, it will be appreciated that in some cases, the multiplier may result in a repetition that is too large. For example, if a repetition in a 5 MHz system bandwidth is 1024, then using a multiplier of 4 would give a repetition of 4096 in a 20 MHz system bandwidth. This may cause an issue since such a large repetition may lead to significant delays. Furthermore, the UE wakes up at every paging occasion and such a large repetition would overlap several paging occasions, thus causing confusion as to when the search space has started. Hence, in another embodiment, if a certain coverage level results in a repetition exceeding a predetermined threshold, then power boosting on the PRB in which the paging CSS is transmitted is automatically applied. For example, a 6 dB power boosting will increase the PSD by 4 times, thereby reducing the repetitions by 4 times. Hence, in the example above, the 4096 repetition in the 20 MHz system would be reduced to 1024.

Thus, it will be appreciated that, in an embodiment, the present technique provides a terminal device (such as an NB-IoT terminal device such as UE 104) for use with a wireless telecommunications network. The terminal device comprises a receiver (such as receiver 402) and a controller (such as controller 403). The controller is operable to control the receiver to receive data (such as control information scheduling a paging message) from the wireless telecommunications network, wherein the data is transmitted using a candidate of a search space (such as an NB-PDCCH Common Search Space (CSS)).

The search space is defined by a plurality of candidates (such as candidates C1 to C4 shown in FIG. 6) and each candidate of the search space is defined by a set of time and/or frequency radio resources for use in repeatedly transmitting the data a number of times associated with that candidate (thus, for example, considering FIG. 6, candidate C1 repeatedly transmits the data R1 times, candidate C2 repeatedly transmits the data R2 times, candidate C3 repeated transmits the data R3 times and candidate C4 repeatedly transmits the data R4 times). The controller is operable to control the receiver to attempt to receive the data from each candidate of the search space (by blind decoding, for example). It is noted that, in some embodiments, time and/or frequency radio resources of each candidate may be shared with another candidate.

The controller is operable to determine the search space on the basis of a predetermined search space (such as one of the Reference Search Spaces (RRSs) shown in Table 1) and one or more multiplier values (such as the multiplier values $M_1$ to $M_4$ of one of the multiplier value sets shown in Table 2). The number of times that data is repeatedly transmittable using each candidate of the search space is determined by multiplying a predetermined number of times that data is repeatedly transmittable using a corresponding candidate of the predetermined search space by a respective one of the multiplier values. Thus, for example, if one of the RSSs shown in Table 1 is the predetermined search space and has candidates C1, C2, C3 and C4 with respective repetition numbers R1, R2, R3 and R4, and the multiplier values are defined as one of the sets of values $M_1$, $M_2$, $M_3$ and $M_4$ shown in Table 2, then the search space used for transmission of the data (such as the NB-PDCCH CSS used for transmission of the scheduling information for the paging message) has candidates C1', C2', C3' and C4' with respective repetition numbers $R1*M_1$, $R2*M_2$, $R3*M_3$ and $R4*M_4$. Each of the one or more multiplier values is variable based on a value of each of one or more predetermined parameters.

As previously mentioned, in one embodiment, the predetermined search space is one of a plurality of predetermined search spaces (such as those defined in Table 1). Each of the plurality of predetermined search spaces is respectively defined by candidates with a different set of characteristics. For example, the candidates of each respective predetermined search space may have a different set of repetition numbers (again, as exemplified in Table 1). Alternatively, the candidates of each respective predetermined search space may be defined by different time and/or frequency radio resources, may have different downlink control information (DCI) sizes, or may have different channel processing configurations (for example, one candidate may be encoded using a Turbo code, whereas another candidate may be encoded with a low density parity check (LDPC) code), for example. The controller is operable to control the receiver to receive data from the wireless telecommunications network indicative of the one of the plurality of predetermined search spaces to be used (the data, such as the RSS number shown in Table 1, being included in the SIB, for example). The candidate characteristics which define each predetermined search space may be defined by the NB-IoT specification (so that, for example, the terminal device is manufactured with the candidate characteristics of each predetermined search space pre-installed) or may be transmitted from the network to the terminal device in advance. In either case, the candidate characteristics which define each predetermined search space are known by both the network and the terminal device and are stored in a storage medium of the terminal device (such as storage medium 420).

As previously mentioned, in one embodiment, the one or more multiplier values form one of a plurality of predetermined sets of multiplier values, and the controller is operable to select the one of the plurality of predetermined sets of multiplier values to be used based on the value of each of the one or more predetermined parameters. Table 2 is an example of such a plurality of predetermined sets of multiplier values.

The one or more predetermined parameters (known parameters) on the basis of which the controller selects the one or more multiplier values has been discussed above. The one or more predetermined parameters are parameters which are known to both the network and the terminal device so as to allow both the network and terminal device to use the same multiplier values (thus meaning that both the network and the terminal device use the same search space). The multiplier values and their relationship to the one or more predetermined parameters may again be defined by the NB-IoT specification (so that, for example, the terminal device is manufactured with the multiplier values and their relationship to the one or more predetermined parameters pre-installed) or may be transmitted from the network to the terminal device in advance (using the MIB or SIB, for example). In either case, the multiplier values and their relationship to the one or more predetermined parameters are stored in a storage medium of the terminal device (such as storage medium 420). For example, a table such as Table 2 may be stored in the storage medium of the terminal device.

In one example, the one or more predetermined parameters comprise a parameter indicating an operation mode of the network. More specifically, when the terminal device is a Narrow Band Internet of Things (NB-IoT) terminal device and the search space is a Narrow Band Physical Downlink Control Channel (NB-PDCCH) search space, the parameter indicates whether the network operates in a stand-alone operation mode, a guard band operation mode or an in-band operation mode when communicating with the terminal device. In one embodiment, the controller may control the receiver to receive from the wireless telecommunications network, as a value of the parameter, data indicative of whether the network operates in the stand-alone operation mode, the guard band operation mode or the in-band operation mode when communicating with the terminal device. In particular, the data indicative of whether the network operates in the stand-alone operation mode, the guard-band operation mode or the in-band operation when communicating with the terminal device may be a starting symbol of a radio subframe via which radio communication between the terminal device and the wireless telecommunications network is enabled. For example, the stand-alone or guard-band operation mode could always be associated with starting symbol=0 where as the in-band operation mode could always be associated with a different starting symbol (such as 2 or 3). In another example, the data indicative of whether the network operates in the stand-alone operation mode, the guard-band operation mode or the in-band operation may be communicated in, for example, the MIB or SIB, either as an explicit bit, or implicitly. In yet another example, the NB-IoT carrier could have different scrambling sequences applied to the reference signals for the different operation modes and the UE could blind decode for the different scrambling sequences in order to work out the operation mode. In this case, the eNB need not send any data indicative of the operation mode, since this may be determined by the UE based on the scrambling sequence which results in a successful decoding. In each of these examples, the controller is able to determine the multiplier values to be used on the basis of which operation mode is used (using, for example, a table such as Table 2).

In another example, the one or more predetermined parameters comprise a parameter indicating an available system bandwidth for radio communication between the terminal device and the wireless telecommunications network. In this case, a higher system bandwidth requires a greater number of repetitions (and thus higher multiplier values for a given predetermined search space) where as a lower system bandwidth requires a lower number of repetitions (and thus lower multiplier values for a given predetermined search space), as previously discussed. In this case, for example, a value of the parameter indicative of the system bandwidth is received from the network by the receiver, thus allowing the controller to determine the multiplier values to be used on the basis of this value. In one embodiment, the UE directly measures the system bandwidth (in which case, the parameter indicative of the system bandwidth is the system bandwidth itself). In another embodiment, the system bandwidth is indicated by the number of PRBs in the system bandwidth (in which case, the parameter indicative of the system bandwidth is this number of PRBs).

In another example, the one or more predetermined parameters comprise a parameter indicating a transmit power of infrastructure equipment of the wireless telecommunications network via which radio communication between the terminal device and the wireless telecommunications network is enabled. In this case, a higher transmit power requires a lower number of repetitions (and thus lower multiplier values for a given predetermined search space) where as a lower transmit power requires a higher number of repetitions (and thus higher multiplier values for a given predetermined search space), as previously discussed. In this case, for example, a value of the parameter indicative of the transmit power of the infrastructure equipment is received from the network by the receiver, thus allowing the controller to determine the multiplier values to be used on the basis of this value. In one embodiment, the parameter indicative of the transmit power is the same parameter used by the UEs in the cell for calculating path loss, and the value of this parameter is broadcast to all UEs in the cell.

In another example (which has not yet been mentioned), the terminal device is a Narrow Band Internet of Things (NB-IoT) terminal device, and the one or more predetermined parameters comprise a parameter indicative of a level of power boosting applied on an NB-IoT narrowband used for communicating with the terminal device by the infrastructure equipment of the wireless telecommunications network via which radio communication between the terminal device and the wireless telecommunications network is enabled. Power boosting can be, for example, 3 dB or 6 dB and is applied to a PRB to effectively increase the PSD by 3 dB or 6 dB, thereby reducing the required number of repetitions. In this case, for example, a value of the parameter indicative of the level of power boosting is received from the network by the receiver, thus allowing the controller to determine the multiplier values to be used on the basis of this value. The level of power boosting can be directly indicated by the network in the SIB. Alternatively this can be derived by the UE by comparing the power of the LTE CRS (cell-specific reference signal, this being a legacy reference signal) against the power used for the data REs (resource elements) in a PRB. It is noted that LTE CRS is used in in-band operation and power boosting is likely to be used for the in-band operation. Since all power is already used for an NB-IoT PRB in stand-alone operation, no further power boosting is possible in stand-alone operation, and hence, if the network indicates the use of the stand-alone operation, then there will not be any power boosting.

It will be appreciated that the multiplier values used may be determined based on more than one parameter. In particular, combinations of all the above-mentioned examples of such parameters may be used. As a particular example, the predetermined parameters may comprise both a parameter indicative of the operation mode and one or more of the respective parameters indicative of the available system bandwidth, infrastructure equipment transmit power and level of narrow band power boosting. The multiplier values used could then be determined on the basis of the values in, for example, a table such as Table 2, weighted on the basis of these one or more additional parameters. For example, each of the multiplier values in the table could be weighted so that they become smaller in the case of narrower system bandwidth, greater infrastructure transmit power and/or greater power boosting (these being cases in which less repetition is required). Conversely, each of the multiplier values in the table could be weighted so that they become larger in the case of wider system bandwidth, lower infrastructure transmit power and/or lower power boosting (these being cases in which more repetition is required). It will be appreciated that, in general, the skilled person may establish any suitable relationship between the multiplier values used and the one or more predetermined parameters on which the multiplier values depend. Such relationships may be implemented by, for example, use of tables (such as Table 2), mathematical functions or a combination of tables and mathematical functions.

To be clear, in embodiments, the relationship between the multiplier values used and the one or more predetermined parameters (such as the relationship between the multiplier values and the predetermined parameter of the operation mode defined in Table 2) is defined in advance. This relationship may be predefined in the specifications or predefined by the network and transmitted to the terminal device in advance (using the SIB, for example). A value of the one or more predetermined parameters (such as a value indicative of one of in-band operation, stand-alone operation or guard band operation, to again use the example of Table 2) is then indicated to the terminal device (using the SIB or MIB, for example) in order to allow transmission of data using the desired search space. To be clear, the relationship between the multiplier values used and the one or more predetermined parameters is the relationship between, for example, the multiplier values and the network operation mode, the system bandwidth, the transmit power of the infrastructure equipment and/or the level of power boosting. A value of the one or more predetermined parameters is then a value indicative of the specific network operation mode, the system bandwidth, the transmit power of the infrastructure equipment and/or the level of power boosting, respectively. Such values are indicated to the terminal device in the MIB or SIB, for example.

In each of the above-described embodiments, the infrastructure equipment which is mentioned may be, for example, eNB 101 shown in FIG. 4. Furthermore, an operation that is said to be carried out by the network may, more specifically, be carried out by infrastructure equipment of the network (such as eNB 101) via which radio communication between the terminal device and the network is enabled. In this case, information known by the network (such as the candidate characteristics which define each predetermined search space and the multiplier values and their relationship to the one or more predetermined parameters) is known, more specifically, by the infrastructure equipment and stored in a storage medium of the infrastructure equipment (such as storage medium 422). Furthermore, data which, in some embodiments, is transmitted from the network to the terminal device (such as the data indicative of the one of the plurality of predetermined search spaces to be used, the candidate characteristics which define each predetermined search space, the multiplier values and their relationship to the one or more predetermined parameters and/or the one or more predetermined parameter values themselves) is, more specifically, transmitted by a transmitter (such as transmitter 411) of the infrastructure equipment under the control of a controller (such as controller 413) of the infrastructure equipment.

Such infrastructure equipment forms a further embodiment of the present technique. More specifically, according to another embodiment of the present technique, there is provided infrastructure equipment (such as eNB 101) for use with a wireless telecommunications network. The infrastructure equipment comprises a transmitter (such as transmitter 411) and a controller (such as controller 413). The controller is operable to control the transmitter to transmit data to a terminal device of the wireless telecommunications network. The data is transmitted using a candidate of a search space, the search space being defined by a plurality of candidates and each candidate of the search space being defined by a set of time and frequency radio resources for use in repeatedly transmitting the data a number of times associated with that candidate. The controller is operable to determine the search space on the basis of a predetermined search space and one or more multiplier values. The number of times that data is repeatedly transmittable using each candidate of the search space is determined by multiplying a predetermined number of times that data is repeatedly transmittable using a corresponding candidate of the predetermined search space by a respective one of the multiplier values. Each of the one or more multiplier values is variable based on a value of each of one or more predetermined parameters. Examples of each of the search space, predetermined search spaces and multiplier values have already been described in detail above.

Figure 7B:
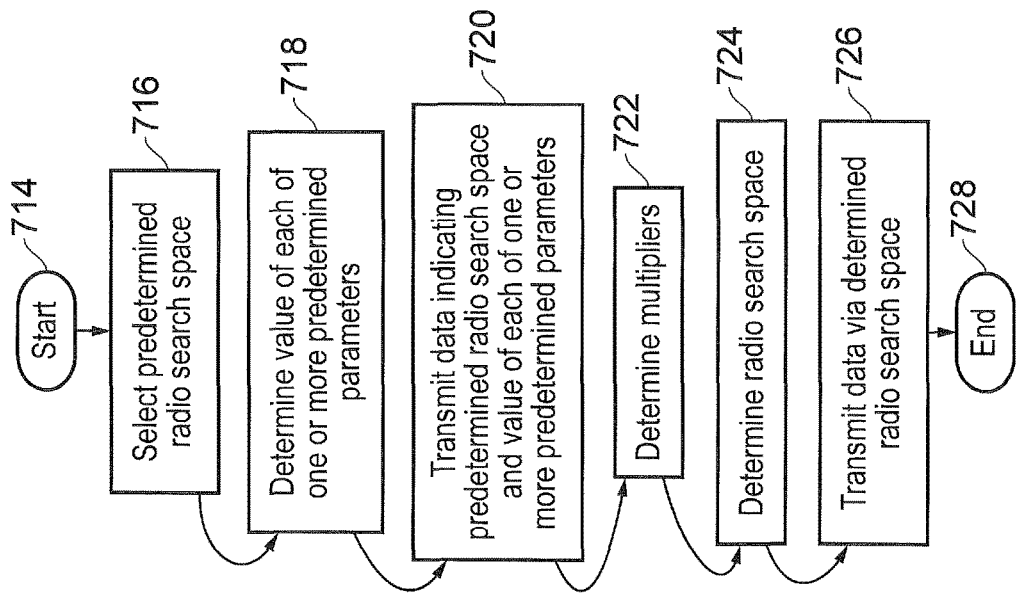
FIGS. 7A and 7B each show a flow chart schematically representing a process according to an embodiment of the present technique.
Figure 7A:
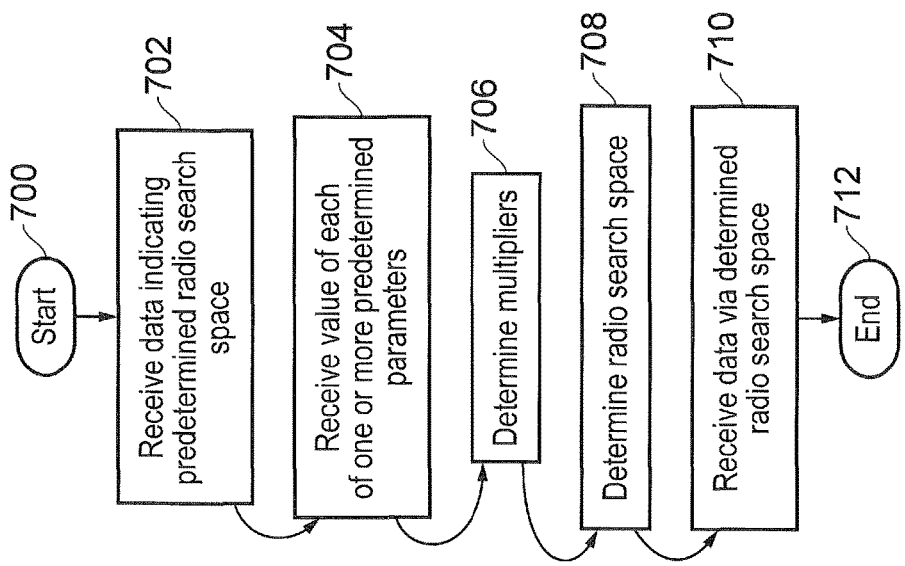

FIGS. 7A and 7B show, respectively, flow charts illustrating processes carried out at the terminal device and infrastructure equipment of embodiments.

Referring to FIG. 7A, the process starts at step 700. At step 702, the receiver of the terminal device receives data indicating a predetermined search space from the set of predetermined search spaces. At step 704, the receiver of the terminal device receives a value of each of the one or more predetermined parameters, on the basis of which the one or more multiplier values are determined at 706. At step 708, the search space for receiving data from the network is determined on the basis of the indicated predetermined search space and the determined one or more multiplier values. At step 710, the receiver of the terminal device receives data from the network via the determined search space. The process then ends at step 712. The process of FIG. 7A is carried out under the control of the controller of the terminal device.

Referring to FIG. 7B, the process starts at step 714. At step 716, a predetermined search space from the set of predetermined search spaces is selected. This may be, for example, on the basis of the expected average coverage level of terminal devices served by the infrastructure equipment (so that, for example, a predetermined search space with higher repetition levels (such as RSS #3 in Table 1) is selected for terminal devices with a lower expected average coverage level (for example, smart meters, which are expected to be deep inside buildings) whereas a predetermined search space with lower repetition levels (such as RSS #4 in Table 1) is selected for terminal devices with a higher expected average coverage level (for example, mobile phones, which are expected to be outside buildings at least some of the time)). At step 718, a value of each of the one or more predetermined parameters is determined. At step 720, data indicative of the selected predetermined search space and the value of each of the one or more predetermined parameters is transmitted to the terminal device. At step 722, the one or more multiplier values are determined on the basis of the value of each of the one or more predetermined parameters. At step 724, the search space for transmitting data to the terminal device is determined on the basis of the selected predetermined search space and the determined one or more multiplier values. At step 726, the transmitter of the infrastructure equipment transmits data to the terminal device via the determined search space. The process then ends at step 728. The process of FIG. 7B is carried out under the control of the controller of the infrastructure equipment.

The terminal device and infrastructure equipment of the present technique are thus arranged, under the control of their respective controllers 403 and 413, to select the same search space for transmission of a given data type, the search space used being determined based on the same predetermined search space and the same one or more multiplier values known to both the terminal device and infrastructure equipment. Such an arrangement allows a range of different search spaces to be efficiently indicated. In particular, the possibility of having the choice of several different search spaces to use for the transmission of data (such as the control information in the NB-PDCCH scheduling the paging message) over the network is realised (thus overcoming the problems associated with reduced granularity of a single search space). At the same time, the need to individually define each possible different search space at both the terminal device side and the network side is alleviated (since only the smaller number of predetermined search spaces are defined and the full set of possible search spaces is determined based on the value of each of the one or more predetermined parameters and the multiplier values).

It is noted that, in a further embodiment, at least one of the one or more multipliers may be equal to zero. This allows the candidate of the predetermined search space to which the multiplier is to be applied to be removed. Thus, for example, if a multiplier M2=0 is applied to a candidate of the predetermined search space with repetition R2, then since M2*R2=0*R2=0, then a candidate generated on the basis of the candidate with repetition R2 will not be used in the resulting search space used for transmitting data to the terminal device.

Features of various embodiments of the present technique are described by the following numbered clauses:

1. A terminal device for use with a wireless telecommunications network, the terminal device comprising:
   a receiver; and
   a controller operable to control the receiver to receive data from the wireless telecommunications network, wherein the data is transmitted using a candidate of a radio search space, the radio search space being defined by a plurality of candidates and each candidate of the radio search space being defined by a set of time and/or frequency radio resources for use in repeatedly transmitting the data a number of times associated with that candidate, and wherein the controller is operable to control the receiver to attempt to receive the data from each candidate of the radio search space;
   wherein
   the controller is operable to determine the radio search space on the basis of a predetermined radio search space and one or more multiplier values, wherein the number of times that data is repeatedly transmittable using each candidate of the radio search space is determined using multiplication of a predetermined number of times that data is repeatedly transmittable using a corresponding candidate of the predetermined radio search space with a respective one of the multiplier values, wherein each of the one or more multiplier values is variable based on a value of each of one or more predetermined parameters.

2. A terminal device according to clause 1, wherein the terminal device is a Narrow Band Internet of Things (NB-IoT) terminal device and the radio search space is a Narrow Band Physical Downlink Control Channel (NB-PDCCH) search space.

3. A terminal device according to clause 1 or 2, wherein the predetermined radio search space is one of a plurality of predetermined radio search spaces, each of the plurality of predetermined radio search spaces respectively being defined by candidates with a different set of characteristics, and the controller is operable to control the receiver to receive data from the wireless telecommunications network indicative of the one of the plurality of predetermined radio search spaces to be used.

4. A terminal device according to any preceding clause, wherein the one or more multiplier values form one of a plurality of predetermined sets of multiplier values, and the controller is operable to select the one of the plurality of predetermined sets of multiplier values to be used based on the value of each of the one or more predetermined parameters.

5. A terminal device according to any preceding clause, wherein the one or more predetermined parameters comprise an operation mode of the network when communicating with the terminal device.

6. A terminal device according to clause 5, wherein the terminal device is a Narrow Band Internet of Things (NB-IoT) terminal device and the radio search space is a Narrow Band Physical Downlink Control Channel (NB-PDCCH) search space, and the operation mode of the network is one of a stand-alone operation mode, a guard band operation mode or an in-band operation mode.

7. A terminal device according to clause 6, wherein a reference signal of the NB-IoT carrier is associated with a different scrambling sequence for each respective operation mode, and the controller is operable to determine whether the network operates in the stand-alone operation mode, the guard band operation mode or the in-band operation mode when communicating with the terminal device by blind decoding for each of the different scrambling sequences.

8. A terminal device according to clause 6, wherein the controller is operable to control the receiver to receive from the wireless telecommunications network data indicative of whether the network operates in the stand-alone operation mode, the guard band operation mode or the in-band operation mode when communicating with the terminal device.

9. A terminal device according to clause 8, wherein the data indicative of whether the network operates in the stand-alone operation mode, the guard-band operation mode or the in-band operation when communicating with the terminal device is a starting symbol of a radio subframe via which radio communication between the terminal device and the wireless telecommunications network is enabled.

10. A terminal device according to clause 8, wherein the data indicative of whether the network operates in the stand-alone operation mode, the guard-band operation mode or the in-band operation when communicating with the terminal device is one or more indication bits in one of the system information block (SIB) or master information block (MIB).

11. A terminal device according to any preceding clause, wherein the one or more predetermined parameters comprise an available system bandwidth for radio communication between the terminal device and the wireless telecommunications network.

12. A terminal device according to any preceding clause, wherein the one or more predetermined parameters comprise a transmit power of infrastructure equipment of the wireless telecommunications network via which radio communication between the terminal device and the wireless telecommunications network is enabled.

13: A terminal device according to any preceding clause, wherein the terminal device is a Narrow Band Internet of Things (NB-IoT) terminal device, and the one or more predetermined parameters comprise a level of power boosting applied on an NB-IoT narrowband used for communicating with the terminal device by infrastructure equipment of the wireless telecommunications network via which radio communication between the terminal device and the wireless telecommunications network is enabled.

14. Infrastructure equipment for use with a wireless telecommunications network, the infrastructure equipment comprising:
   a transmitter; and
   a controller operable to control the transmitter to transmit data to a terminal device of the wireless telecommunications network, wherein the data is transmitted using a candidate of a radio search space, the radio search space being defined by a plurality of candidates and each candidate of the radio search space being defined by a set of time and frequency radio resources for use in repeatedly transmitting the data a number of times associated with that candidate;
   wherein the controller is operable to determine the radio search space on the basis of a predetermined radio search space and one or more multiplier values, wherein the number of times that data is repeatedly transmittable using each candidate of the radio search space is determined using multiplication of a predetermined number of times that data is repeatedly transmittable using a corresponding candidate of the predetermined radio search space with a respective one of the multiplier values, wherein each of the one or more multiplier values is variable based on a value of each of one or more predetermined parameters.

15. Infrastructure equipment according to clause 14, wherein the terminal device is a Narrow Band Internet of Things (NB-IoT) terminal device and the radio search space is a Narrow Band Physical Downlink Control Channel (NB-PDCCH) search space.

16. Infrastructure equipment according to clause 14 or 15, wherein the predetermined radio search space is one of a plurality of predetermined radio search spaces, each of the plurality of predetermined radio search spaces respectively being defined by candidates with a different set of characteristics, and the controller is operable to control the transmitter to transmit data to the terminal device indicative of the one of the plurality of predetermined radio search spaces to be used.

17. Infrastructure equipment according to any one of clauses 14 to 16, wherein the one or more multiplier values form one of a plurality of predetermined sets of multiplier values, and the controller is operable to select the one of the plurality of predetermined sets of multiplier values to be used based on the value of each of the one or more predetermined parameters.

18. Infrastructure equipment according to any one of clauses 14 to 17, wherein the one or more predetermined parameters comprise an operation mode of the infrastructure equipment when communicating with the terminal device.

19. Infrastructure equipment according to clause 18, wherein the terminal device is a Narrow Band Internet of Things (NB-IoT) terminal device and the radio search space is a Narrow Band Physical Downlink Control Channel (NB-PDCCH) search space, and the operation mode of the infrastructure equipment is one of a stand-alone operation mode, a guard band operation mode or an in-band operation mode.

20. Infrastructure equipment according to clause 19, wherein the controller is operable to scramble a reference signal of the NB-IoT carrier using a different scrambling sequence for each respective operation mode.

21. Infrastructure equipment according to clause 19, wherein the controller is operable to control the transmitter to transmit to the terminal device data indicative of whether the infrastructure operates in the stand-alone operation mode, the guard band operation mode or the in-band operation mode when communicating with the terminal device.

22. Infrastructure equipment according to clause 21, wherein the data indicative of whether the infrastructure operates in the stand-alone operation mode, the guard-band operation mode or the in-band operation when communicating with the terminal device is a starting symbol of a radio subframe via which radio communication between the terminal device and the infrastructure equipment is enabled.

23. Infrastructure equipment according to clause 21, wherein the data indicative of whether the network operates in the stand-alone operation mode, the guard-band operation mode or the in-band operation when communicating with the terminal device is one or more indication bits in one of the system information block (SIB) or master information block (MIB).

24. Infrastructure equipment according to any one of clauses 14 to 23, wherein the one or more predetermined parameters comprise an available system bandwidth for radio communication between the terminal device and the infrastructure equipment.

25. Infrastructure equipment according to any one of clauses 14 to 24, wherein the one or more predetermined parameters comprise a transmit power of the infrastructure equipment.

26. Infrastructure equipment according to any one of clauses 14 to 26, wherein the terminal device is a Narrow Band Internet of Things (NB-IoT) terminal device, and the one or more predetermined parameters comprise a level of power boosting applied on an NB-IoT narrowband used for communicating with the terminal device by the infrastructure equipment.

27. Infrastructure equipment according to any of clauses 14 to 26, wherein when the number of times that data is repeatedly transmittable using a candidate of the radio search space is determined to be greater than a predetermined threshold, the controller is operable to reduce the number of times that data is repeatedly transmittable using a candidate of the radio search space to a value less than or equal to the predetermined threshold, and to apply, in combination with the transmitter, power boosting to a physical resource block (PRB) of the radio search space to compensate for the reduction in the number of times that data is repeatedly transmittable using a candidate of the radio search space.

28. A method of operating a terminal device for use with a wireless telecommunications network, the method comprising:
controlling a receiver of the terminal device to receive data from the wireless telecommunications network, wherein the data is transmitted using a candidate of a radio search space, the radio search space being defined by a plurality of candidates and each candidate of the radio search space being defined by a set of time and frequency radio resources for use in repeatedly transmitting the data a number of times associated with that candidate, and wherein the receiver is controlled to attempt to receive the data from each candidate of the radio search space;
wherein
the radio search space is determined on the basis of a predetermined radio search space and one or more multiplier values, wherein the number of times that data is repeatedly transmittable using each candidate of the radio search space is determined using multiplication of a predetermined number of times that data is repeatedly transmittable using a corresponding candidate of the predetermined radio search space with a respective one of the multiplier values, wherein each of the one or more multiplier values is variable based on a value of each of one or more predetermined parameters.

29. A method of operating infrastructure equipment for use with a wireless telecommunications network, the method comprising:
controlling a transmitter of the infrastructure equipment to transmit data to a terminal device of the wireless telecommunications network, wherein the data is transmitted using a candidate of a radio search space, the radio search space being defined by a plurality of candidates and each candidate of the radio search space being defined by a set of time and frequency radio resources for use in repeatedly transmitting the data a number of times associated with that candidate;

wherein the radio search space is determined on the basis of a predetermined radio search space and one or more multiplier values, wherein the number of times that data is repeatedly transmittable using each candidate of the radio search space is determined using multiplication of a predetermined number of times that data is repeatedly transmittable using a corresponding candidate of the predetermined radio search space with a respective one of the multiplier values, wherein each of the one or more multiplier values is variable based on a value of each of one or more predetermined parameters.

30. Integrated circuitry for a terminal device for use with a wireless telecommunications network, the integrated circuitry comprising:

a receiver element; and a controller element operable to control the receiver element to receive data from the wireless telecommunications network, wherein the data is transmitted using a candidate of a radio search space, the radio search space being defined by a plurality of candidates and each candidate of the radio search space being defined by a set of time and/or frequency radio resources for use in repeatedly transmitting the data a number of times associated with that candidate, and wherein the controller element is operable to control the receiver element to attempt to receive the data from each candidate of the radio search space;

wherein the controller element is operable to determine the radio search space on the basis of a predetermined radio search space and one or more multiplier values, wherein the number of times that data is repeatedly transmittable using each candidate of the radio search space is determined using multiplication of a predetermined number of times that data is repeatedly transmittable using a corresponding candidate of the predetermined radio search space with a respective one of the multiplier values, wherein each of the one or more multiplier values is variable based on a value of each of one or more predetermined parameters.

31. Integrated circuitry for infrastructure equipment for use with a wireless telecommunications network, the integrated circuitry comprising:

a transmitter element; and a controller element operable to control the transmitter element to transmit data to a terminal device of the wireless telecommunications network, wherein the data is transmitted using a candidate of a radio search space, the radio search space being defined by a plurality of candidates and each candidate of the radio search space being defined by a set of time and frequency radio resources for use in repeatedly transmitting the data a number of times associated with that candidate;

wherein the controller element is operable to determine the radio search space on the basis of a predetermined radio search space and one or more multiplier values, wherein the number of times that data is repeatedly transmittable using each candidate of the radio search space is determined using multiplication of a predetermined number of times that data is repeatedly transmittable using a corresponding candidate of the predetermined radio search space with a respective one of the multiplier values, wherein each of the one or more multiplier values is variable based on a value of each of one or more predetermined parameters.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Annex 1:

The simplified structure of the downlink of an LTE wireless access interface presented in FIG. 2, also includes an illustration of each subframe 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel PDCCH, a physical control format indicator channel PCFICH and a physical HARQ indicator channel PHICH. The data region may contain a number of physical channel for the transmission of data, such as a physical downlink shared channel PDSCH and a physical broadcast channels PBCH. Although these physical channels provide a wide range of functionality to LTE systems, in terms of resource allocation and the present disclosure PDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control RRC signalling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information DCI, where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Each uplink subframe may include a plurality of different channels, for example a physical uplink shared channel PUSCH 305, a physical uplink control channel PUCCH 306, and a physical random access channel PRACH. The physical Uplink Control Channel PUCCH may carry control information such as ACK/NACK to the eNodeB for downlink transmissions, scheduling request indicators SRI for UEs wishing to be scheduled uplink resources, and feedback of downlink channel state information CSI for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals DMRS 307 and sounding reference signals SRS 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information UCI on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

REFERENCES

[1] LTE for UMTS: OFDMA and SC-FDMA Based Radio Access, Harris Holma and Antti Toskala, Wiley 2009, ISBN 978-0-470-99401-6.

[2] RP-151621, "New Work Item: NarrowBand IOT NB-IOT," Qualcomm, RAN #69

[3] R1-157783, "Way Forward on NB-IoT," CMCC, Vodafone, Ericsson, Huawei, HiSilicon, Deutsche Telekom, Mediatek, Qualcomm, Nokia Networks, Samsung, Intel, Neul, CATR, AT&T, NTT DOCOMO, ZTE, Telecom Italia, IITH, CEWiT, Reliance-Jio, CATT, u-blox, China Unicom, LG Electronics, Panasonic, Alcatel-Lucent, Alcatel-Lucent Shanghai Bell, China Telecom, RAN1#83

The invention claimed is:

1. A terminal device for use with a wireless telecommunications network, the terminal device comprising:
   a receiver; and
   a controller operable to control the receiver to receive data from the wireless telecommunications network, wherein the data is transmitted using a candidate of a radio search space, the radio search space being defined by a plurality of candidates and each candidate of the radio search space being defined by a set of time and/or frequency radio resources for use in repetitions, the repetitions corresponding to in repeatedly transmitting the data a number of times associated with that candidate, and wherein the controller is operable to control the receiver to attempt to receive the data from each candidate of the radio search space;
   wherein
   the controller is operable to determine the radio search space based on a predetermined radio search space and one or more multiplier values, wherein the number of times that data is repeatedly transmittable using each candidate of the radio search space is determined using multiplication of a predetermined number of times that data is repeatedly transmittable using a corresponding candidate of the predetermined radio search space with a respective one of the multiplier values, wherein each of the one or more multiplier values is variable based on a value of each of one or more predetermined parameters, and
   in response to a coverage level resulting in the repetitions exceeding a predetermined threshold, the controller is operable to automatically apply power boosting on a physical resource block in which a paging search space is transmitted.

2. A terminal device according to claim 1, wherein the terminal device is a Narrow Band Internet of Things (NB-IoT) terminal device and the radio search space is a Narrow Band Physical Downlink Control Channel (NB-PDCCH) search space.

3. A terminal device according to claim 1, wherein the predetermined radio search space is one of a plurality of predetermined radio search spaces, each of the plurality of predetermined radio search spaces respectively being defined by candidates with a different set of characteristics, and the controller is operable to control the receiver to receive data from the wireless telecommunications network indicative of the one of the plurality of predetermined radio search spaces to be used.

4. A terminal device according to claim 1, wherein the one or more multiplier values form one of a plurality of predetermined sets of multiplier values, and the controller is operable to select the one of the plurality of predetermined sets of multiplier values to be used based on the value of each of the one or more predetermined parameters.

5. A terminal device according to claim 1, wherein the one or more predetermined parameters comprise an operation mode of the network when communicating with the terminal device.

6. A terminal device according to claim 5, wherein the terminal device is a Narrow Band Internet of Things (NB-IoT) terminal device and the radio search space is a Narrow Band Physical Downlink Control Channel (NB-PDCCH) search space, and the operation mode of the network is one of a stand-alone operation mode, a guard band operation mode or an in-band operation mode.

7. A terminal device according to claim 6, wherein a reference signal of the NB-IoT carrier is associated with a different scrambling sequence for each respective operation mode, and the controller is operable to determine whether the network operates in the stand-alone operation mode, the guard band operation mode or the in-band operation mode when communicating with the terminal device by blind decoding for each of the different scrambling sequences.

8. A terminal device according to claim 6, wherein the controller is operable to control the receiver to receive from the wireless telecommunications network data indicative of whether the network operates in the stand-alone operation mode, the guard band operation mode or the in-band operation mode when communicating with the terminal device.

9. A terminal device according to claim 8, wherein the data indicative of whether the network operates in the stand-alone operation mode, the guard-band operation mode or the in-band operation when communicating with the terminal device is a starting symbol of a radio subframe via which radio communication between the terminal device and the wireless telecommunications network is enabled.

10. A terminal device according to claim 8, wherein the data indicative of whether the network operates in the stand-alone operation mode, the guard-band operation mode or the in-band operation when communicating with the terminal device is one or more indication bits in one of the system information block (SIB) or master information block (MIB).

11. A terminal device according to claim 1, wherein the one or more predetermined parameters comprise an available system bandwidth for radio communication between the terminal device and the wireless telecommunications network.

12. A terminal device according to claim 1, wherein the one or more predetermined parameters comprise a transmit power of infrastructure equipment of the wireless telecommunications network via which radio communication between the terminal device and the wireless telecommunications network is enabled.

13. A terminal device according to claim 1, wherein the terminal device is a Narrow Band Internet of Things (NB-IoT) terminal device, and the one or more predetermined parameters comprise a level of power boosting applied on an NB-IoT narrowband used for communicating with the terminal device by infrastructure equipment of the wireless telecommunications network via which radio communication between the terminal device and the wireless telecommunications network is enabled.

14. Infrastructure equipment for use with a wireless telecommunications network, the infrastructure equipment comprising:
   a transmitter; and
   a controller operable to control the transmitter to transmit data to a terminal device of the wireless telecommunications network, wherein the data is transmitted using a candidate of a radio search space, the radio search space being defined by a plurality of candidates and each candidate of the radio search space being defined by a set of time and frequency radio resources for use in repetitions, the repetitions corresponding to repeatedly transmitting the data a number of times associated with that candidate;
   wherein
   the controller is operable to determine the radio search space based on a predetermined radio search space and one or more multiplier values, wherein the number of times that data is repeatedly transmittable using each candidate of the radio search space is determined using multiplication of a predetermined number of times that data is repeatedly transmittable using a corresponding candidate of the predetermined radio search space with a respective one of the multiplier values, wherein each of the one or more multiplier values is variable based on a value of each of one or more predetermined parameters, and in response to a coverage level resulting in the repetitions exceeding a predetermined threshold, the controller is operable to automatically apply power boosting on a physical resource block in which a paging search space is transmitted.

15. Infrastructure equipment according to claim 14, wherein the terminal device is a Narrow Band Internet of Things (NB-IoT) terminal device and the radio search space is a Narrow Band Physical Downlink Control Channel (NB-PDCCH) search space.

16. Infrastructure equipment according to claim 14, wherein the predetermined radio search space is one of a plurality of predetermined radio search spaces, each of the plurality of predetermined radio search spaces respectively being defined by candidates with a different set of characteristics, and the controller is operable to control the transmitter to transmit data to the terminal device indicative of the one of the plurality of predetermined radio search spaces to be used.

17. Infrastructure equipment according to claim 14, wherein the one or more multiplier values form one of a plurality of predetermined sets of multiplier values, and the controller is operable to select the one of the plurality of predetermined sets of multiplier values to be used based on the value of each of the one or more predetermined parameters.

18. Infrastructure equipment according to claim 14, wherein the one or more predetermined parameters comprise an operation mode of the infrastructure equipment when communicating with the terminal device.

19. Infrastructure equipment according to claim 18, wherein the terminal device is a Narrow Band Internet of Things (NB-IoT) terminal device and the radio search space is a Narrow Band Physical Downlink Control Channel (NB-PDCCH) search space, and the operation mode of the infrastructure equipment is one of a stand-alone operation mode, a guard band operation mode or an in-band operation mode.

20. Integrated circuitry for a terminal device for use with a wireless telecommunications network, the integrated circuitry comprising:

a receiver; and a controller operable to control the receiver to receive data from the wireless telecommunications network, wherein the data is transmitted using a candidate of a radio search space, the radio search space being defined by a plurality of candidates and each candidate of the radio search space being defined by a set of time and/or frequency radio resources for use in repetitions, the repetitions corresponding to repeatedly transmitting the data a number of times associated with that candidate, and wherein the controller is operable to control the receiver to attempt to receive the data from each candidate of the radio search space;

wherein the controller is operable to determine the radio search space based on a predetermined radio search space and one or more multiplier values, wherein the number of times that data is repeatedly transmittable using each candidate of the radio search space is determined using multiplication of a predetermined number of times that data is repeatedly transmittable using a corresponding candidate of the predetermined radio search space with a respective one of the multiplier values, wherein each of the one or more multiplier values is variable based on a value of each of one or more predetermined parameters, and in response to a coverage level resulting in the repetitions exceeding a predetermined threshold, the controller is operable to automatically apply power boosting on a physical resource block in which a paging search space is transmitted.

* * * * *